May 16, 1967 W. M. BECKER 3,320,587

METHODS AND APPARATUS FOR COMPARING THE MAGNITUDE OF TWO NUMBERS IN BINARY CODE

Filed Sept. 30, 1963 2 Sheets-Sheet 1

INVENTOR
Winfried M. Becker
BY
ATTORNEYS

INVENTOR
Winfried M. Becker
BY
ATTORNEYS

United States Patent Office 3,320,587
Patented May 16, 1967

3,320,587

METHODS AND APPARATUS FOR COMPARING THE MAGNITUDE OF TWO NUMBERS IN BINARY CODE

Winfried M. Becker, Berlin, Germany, assignor to European Atomic Energy Community—Euratom, Brussels, Belgium Filed Sept. 30, 1963, Ser. No. 312,720
Claims priority, application Great Britain, Oct. 1, 1962, 37,160/62
3 Claims. (Cl. 340—146.2)

Figure 1:
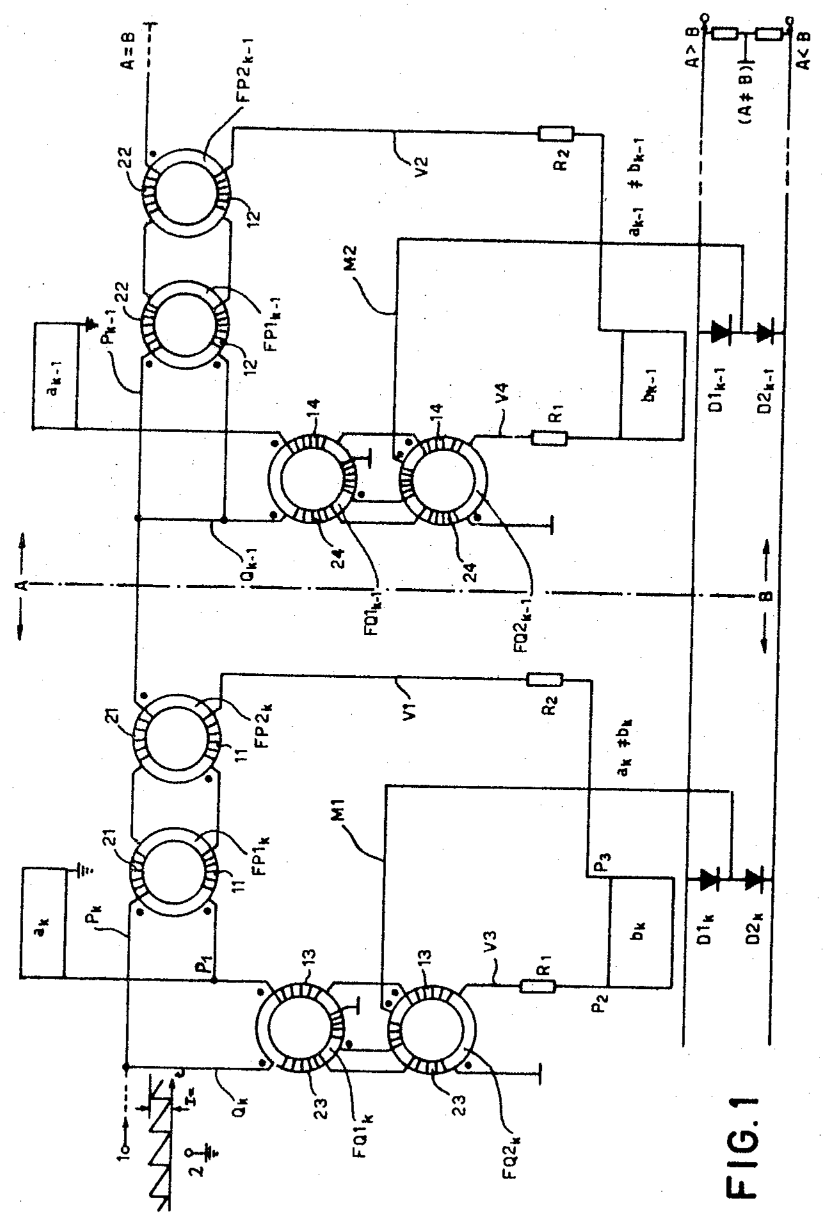

The invention relates to improvements in or relating to apparatus for comparing the magnitude of two numbers in binary code.

More particularly the invention relates to apparatus for comparing the magnitude of two numbers in binary code A, B by means of two associated digit memory groups connected to a comparison network which is supplied with an auxiliary current and which has outputs $A=B$, $A>B$, $A<B$.

Apparatus of this kind for comparing two binary code numbers A, B; operates by starting from the binary digit pairs $a_i$, $b_i$ of greatest magnitude, and proceeding in decreasing order of magnitude. The binary digit pair of the highest order of magnitude in which the two binary digits of the numbers A and B to be compared do not agree are used to form the result $A<B$ or $A>B$. If neither result exists, then the result $A=B$ must exist.

In practice, this principle is embodied by means of comparison systems having three-way switches of some form. An auxiliary current supplied to the system passes through it unhindered—starting at the digit pair of highest magnitude and continuing via the switching elements associated with the digit pairs $a_i$, $b_i$—when there is coincidence between them—i.e., when both of them are either 1 or 0. The auxiliary current, immediately it detects the first digit pair not in coincidence, is gated by the corresponding switching or gating element to one of the outputs $A>B$ or $A<B$ common to all the digit pairs and is prevented from reaching the gating or switching elements for digit pairs of lower magnitude.

The invention provides apparatus for comparing the magnitude of two numbers in binary code which apparatus comprises an electrical comparison means for comparing the binary digits of the same order of magnitude of the two numbers respectively, the comparison means comprising at least one electro-magnetic inductive device, means for feeding an auxiliary fluctuating electrical supply to the device, and means for simultaneously feeding to the device electrical signals representing the two digits respectively thereby to vary the impedance of the device, and hence the flow of auxiliary current, according to the relative magnitude of the signals.

Preferably the auxiliary current is at a maximum when the digits are equal and is fed to the second comparison device for comparing the digits of the next lower order of magnitude, or to an indicator of equality. Preferably there is a second electro-magnetic inductive device with feeding means as aforesaid, the connections of one being so arranged that equality of digits produces a maximum auxiliary current, and the connections and arrangement of the other being such that inequality of the digits produces directly or indirectly a maximum current in the auxiliary circuit or in a further circuit.

Preferably the arrangement is such that equality of digits produces a maximum auxiliary current as aforesaid by direct electrical connection through the said one device, and inequality of digits produces a maximum current as aforesaid in a further circuit by inductive coupling through the said other device. Preferably each electro-magnetic inductive device is saturable, and the arrangement is such that when the two digits are equal the said one device is saturated and the said other device is unsaturated, and that when the two digits are unequal the said one device is unsaturated and the said other device is saturated.

Preferably the or each electro-magnetic inductive device comprises a ferrite core.

Preferably the auxiliary fluctuating electrical signal is a current high frequency sawtooth waveform which does not pass through zero.

The invention also provides apparatus for comparing the magnitude of two binary code numbers A, B including two digit input groups for the digits $a_i$, $b_i$ of the number A, B respectively, connected to a comparison network which is supplied with an auxiliary high-frequency sawtooth current which does not pass through zero, and which apparatus has outputs $$A=B,\ A>B,\ A<B$$

which comparison network has, for each input pair $a_i$, $b_i$ a current path comprising D.C. controlled ferrite cores each having a non-rectangular hysteresis loop to the output $A=B$ and to an output $A\neq B$, the current paths to the output $A=B$ being directly electrically connected for all the inputs $a_i$, $b_i$, while the current paths to the output $A\neq B$ are inductively connected via ferrite cores and rectifiers to the outputs $A>B$, $A<B$; the inputs being in the form of D.C. voltages which are connected into premagnetising circuits for the ferrite cores.

Preferably the apparatus includes resistors for adjusting the working point of the ferrite cores in the premagnetising circuit for the core or cores associated with each current path, the resistors being such, and the inputs being so connected to the circuit, that in the event of $a_i=b_i=1$ or 0, the working point of the ferrite cores associated with the current path to the output $A=B$, in the positive or negative state, is at twice the saturation field strength whereas the working point for the cores associated with the current path extending to the output $A\neq B$ is at the zero hysteresis point; and in the event of $a_i\neq b_i$, the working point of the ferrite cores in the current path extending to the output $A=B$ is at the zero hysteresis point, whereas the working point for the cores of the current path extending to the output $A\neq B$ is, in the positive or negative sense, at the saturation field strength for $a_i>b_i$ and $a_i<b_i$ respectively.

Preferably the hysteresis loop for the core associated with the current path extending to the output $A=B$ has an amplitude equal to the saturation field strength, whereas the hysteresis loop for the core associated with the current path extending to the output $A\neq B$ has an amplitude equal to twice the saturation field strength.

Preferably two cores are associated with each current path, to provide decoupling.

Figure 2:
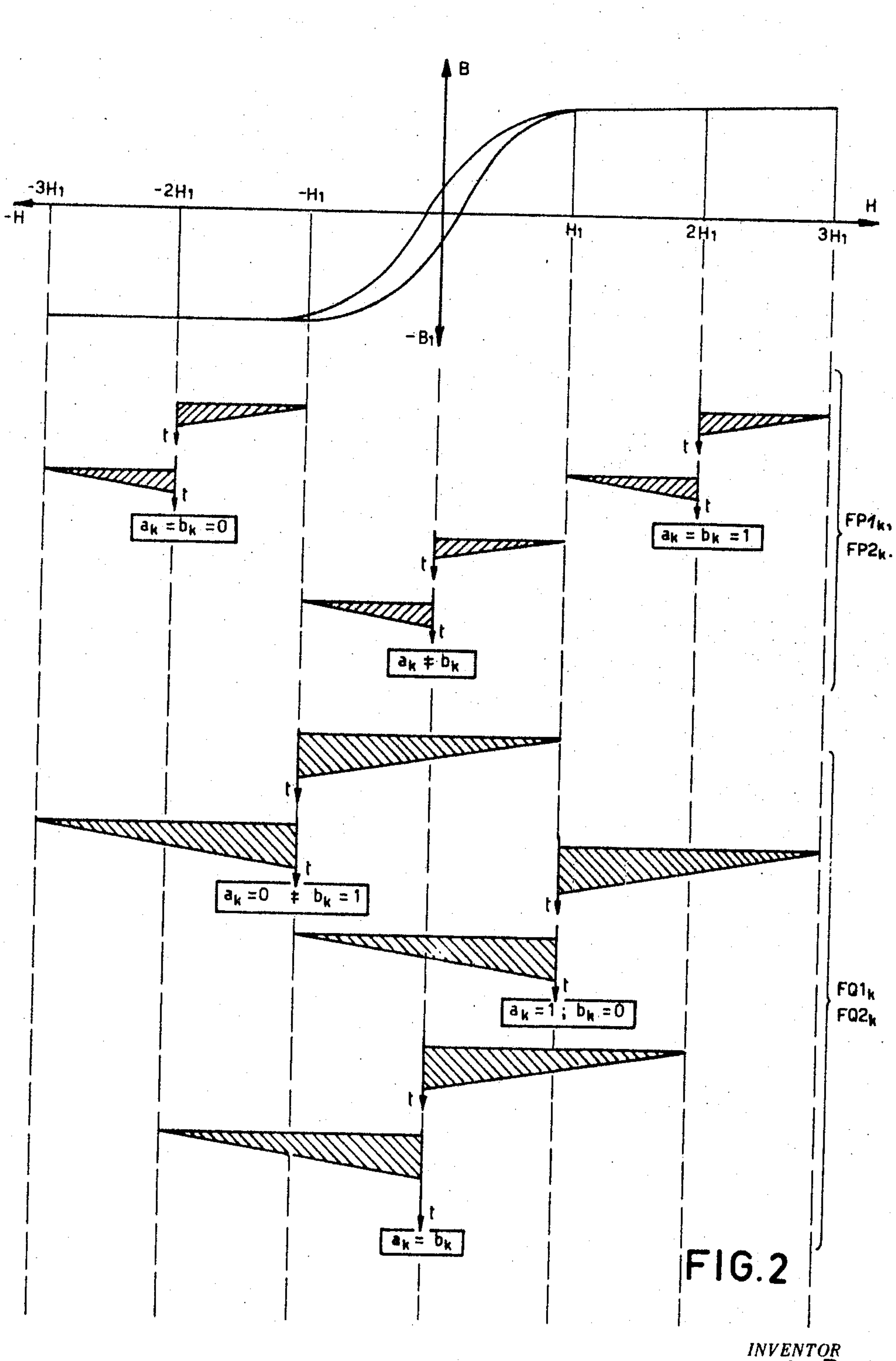

An embodiment of the invention will now be described with reference to the accompanying drawings in which:

FIGURE 1 illustrates the circuit arrangement for the first two digit pairs (further corresponding comparator stages are also provided for the subsequent digit pairs); and, FIGURE 2 diagrammatically illustrates the hysteresis loop with the working points and the modulation of the ferrite cores.

Referring to FIGURE 1, the first two digit inputs for a binary number A have the references $a_k$ and $a_k-1$, the first two digit inputs for the binary number B having the reference $b_k$ and $b_k-1$. An auxiliary generator supplies via terminals 1, 2 to a comparison network, whose outputs $A=B$, $A>B$, $A<B$ are on the right in FIGURE 1, a sawtooth current which does not pass through zero and which has an amplitude $Im$ and a frequency of 5 kc./s.

The comparison network has for the first input pair the current paths $P_k$, $Q_k$ comprising D.C. controlled ferrite cores $FP1_k$, $FP2_k$ respectively of non-rectangular hysteresis loop characteristics, extending to the output $A=B$, and $FQ1_k$, $FQ2_k$, respectively, extending to the combined output $A \neq B$.

In this example, the ferrite cores are of toroidal cores and two cores are provided for each current path to ensure decoupling.

The current paths $P_k$, $P_{k-1}$ for the two memory pairs $a_k$, $b_k$ and $a_{k-1}$, $b_{k-1}$ respectively are directly electrically connected to the output $A=B$ whereas the current paths $Q_k$, extending to the combined output $A \neq B$ are independently and inductively coupled via the associated ferrite cores $FQ1_k$; $FQ2_k$ and $FQ1_{k-1}$; $FQ2_{k-1}$, and the measuring arms $M_1$, $M_2$ respectively. These latter are taken via rectifiers $D1_k$, $D2_k$ and $D1_{k-1}$, $D2_{k-1}$ respectively directly to the outputs $A>B$, $A<B$.

The inputs $a_k$, $b_k$ and and $a_{k-1}$, $b_{k-1}$ are connected as voltage sources into the D.C. premagnetising circuits V1, V3 and V2, V4 containing premagnetising windings 11, 13 and 12, 14 respectively. These circuits contain resistors $R_1$, $R_2$ for each current path which are adapted to adjust the working point of the ferrite cores, the resistors being of a size and design such and being so distributed amongst the arms of the premagnetising circuits and the operating conditions of the various cores are as diagrammatically illustrated in FIGURE 2. In FIGURE 2, the time axes, denoted by the reference $t$, always represent those positions of the working points of the core which relatively to field strength values are determined by the D.C. premagnetisation. Also, the field strength curves—i.e., the triangles to the right and left of the time axes—are always produced by the same auxiliary sawtooth current of amplitude $Im$.

FIGURE 2 shows that when $a_k=b_k=1$ or $a_k=b_k=0$ for the current path $P_k$ to the output $A=B$, the working point of the corresponding ferrite cores $FP1_k$, $FP2_k$ is, in the positive or negative range, twice the saturating field strength $H_1$, but the working point for the cores $FQ1_k$, $FQ2_k$ of the current path $Q_k$ extending to the output $A \neq B$ comes at the zero hysteresis point. Conversely, when $a_k \neq b_k$ for the current path $P_k$, the working point of the associated ferrite cores $FP1_k$, $FP2_k$ comes at the zero hysteresis point, whereas the working point for the cores $FQ1_k$, $FQ2_k$ of the current path $Q_k$ extending to the outputs $A \neq B$ is, when $a_k<b_k$ and $a_k>b_k$ is, in the positive or negative sense, at the single saturating field strength.

The auxiliary current windings 21, 22, 23 and 24 of the ferrite cores are of a size and design such that, in the case of the current path extending to the output $A=B$, the hysteresis loop of the cores $FP1_k$ and $FP2_k$ has an amplitude equal to the saturation field strength, whereas in the case of the current path to the output $A \neq B$, the hystersis loop of the cores of $FQ1_k$, $FQ2_k$ has an amplitude equal to twice the saturating field strength.

The construction and operation of the comparison stage associated with the next lowest digit pair $a_{k-1}$, $b_{k-1}$, and all the successive stages, is precisely similar.

The comparison apparatus operates as follows:

When $a_k=b_k$, the voltage difference between the points $P_1$ and $P_2$ (not $P_3$) is zero and a premagnesising current flows from $P_1$ to $P_3$ or from $P_3$ to $P_1$, depending upon whether $a_k=b_k=1$ or $a_k=b_k=0$. As can be seen in the top half of FIGURE 2, this current shifts the working point of the ferrite cores $FP1_k$, $FP2_k$ to twice the saturating field strength—to $+2H_1$ in one case and $-2H_1$ in the other case. The hysteresis loop then has the shape and direction shown by the triangles illustrated in FIGURE 2, in accordance with the sawtooth voltage, the winding direction and the number of turns. The windings 21 of the cores $FP1_k$, $FP2_k$ in the particular arms concerned of the hysteresis loop offer substantially zero impedance to the auxiliary sawtooth current which therefore passes to the next comparator stage. If $a_{k-1}=b_{k-1}$ in the next comparator stage and all the successive stages, the current flows to the output $A=B$.

The output signal $A=B$ may alternatively be derived from the absence of output signals $A>B$ and $A<B$.

In the case when $a_k=b_k$ there is no premagnetisation of the ferrite cores $FQ1_k$, $FQ2_k$—i.e., their working point is at the zero hysteresis point as shown in the bottom half of FIGURE 2. The amplitude of the hysteresis loop is, for these cores of the measuring arm $M_1$, twice as great as for the cores $FP1_k$, $FP2_k$. The output signals produced in the measuring windings cancel one another out.

When $a_k \neq b_k$, that part of the premagnetising circuit which is disposed between $P_1$ and $P_3$ ceases to have current flowing through it—i.e., only the cores $FQ1_k$, $FQ2_k$ are premagnetised in one direction or the other, according to whether $a_k$ or $b_k$ is equal to 1. The working point of the cores $FP1_k$, $FP2_k$ remains at the zero hysteresis point (see FIGURE 2)—i.e., by their high inductance they prevent the passage of the sawtooth current. The windings of the cores of the current path $Q_k$, however, have little impedance—i.e., if $a_k=1$ ($b_k=0$), the sawtooth current in the core $FQ1_k$, as can be seen in FIGURE 2, drives the hysteresis loop from $H_1$ as far as $3H_1$—i.e., far into saturation—whereas core $FQ2_k$ is driven from $H_1$ to $-H_1$. In the present case, therefore, the last-mentioned core delivers an output voltage i.e. the output signal $A>B$.

When $b_k=1$ ($a_k=0$), the roles of the cores $FQ1_k$ and $FQ2_k$ are reversed—i.e., core $FQ2_k$ is in the saturated state ($-H_1$ to $-3H_1$) and core $FQ1_k$ supplies an output signal $A<B$.

The measuring arm $M_1$ transmits the signals to diodes $D1_k$, $D2_k$ which, depending upon their polarity, convey the signals to the outputs $A>B$ or $A<B$.

The operation of the next comparison stage and all the successive stages, is precisely similar.

Comparison apparatus has been proposed in which digit comparison is performed, for instance, by means of mechanical relays, special electron beam tubes or logical elements. With mechanical relays, considerable current is consumed, the switching rate is too low and servicing is a problem; the cost of electron beam tubes is excessive, even when they are mass produced, and amplifiers must be provided in the signal channel, while with logical components, the advantage of having a large number of comparison stages is offset either by a considerable outlay on logical elements or by having to use amplifiers.

The comparison apparatus described in the foregoing example has a comparison network which is extremely simple in construction, robust, highly reliable and long-lived, yet rapid and cheap. The ferrite cores perform a number of functions in a very simple circuit arrangement. The rate of operation, which is mainly determined by distortion of hysteresis and by the increase of wattles power required for the saturating magnetisation at high frequencies of magnetisation reversal, depends only upon the state of development of material but not upon the construction or upon the outlay of the circuit arrangement. A switching frequency of about 10 kc./s. can be achieved. Another advantage of the example ferrite core circuit arrangement described above is that it can readily be miniaturised, particularly if embodied using ring cores.

The rate of operation of the comparison apparatus of this example is limited mainly by the fact that the switching which ferrite core arrangements can provide falls off appreciably at around 10 kc./s. Also, the voltages induced in the measuring windings of the cores $FQ1_k$, $FQ2_k$ must not be allowed to upset the outputs during the transient times of the digit memories for A or B.

The invention is not restricted to the details of the foregoing example. For instance, the ferrite cores may be of shapes other than toroidal.

It is preferable for the circuit arrangement illustrated in FIGURE 1 to include, after a number of comparator stages, and in dependence upon copper and iron losses, a pulse regenerator in the current path P for the signal $A=B$. In large apparatus the auxiliary current generator can be a central device used for a number of comparators, so that once the auxiliary current generator has been provided, developments of the apparatus require no further outlay on such generator.

I claim:

1. Apparatus for comparing parallelly the magnitude of two binary coded numbers which are signified by one of two distinct voltages in each of several binary stages, comprising, for each binary stage, a first magnetic core with two windings, the first windings of all binary stages being connected serially and the second windings of all binary stages being supplied by said two distinct voltages, as to be driven into saturation when the two distinct voltage values are different, an auxiliary fluctuating current source input coupled to the first winding of said first magnetic core of the highest order stage, each said binary stage having two additional magnetic cores without considerable rectangularity having three windings respectively, one of said three windings being for said distinct voltages, another of said three windings being for said auxiliary fluctuating current source input, and the third of said three windings being for an output, said one, another and third windings being serially connected by corresponding pairs for each said additional magnetic cores, and said output being applied to at least one output bus line via diodes.

2. Apparatus according to claim 1, in which the amplitude of the said auxiliary fluctuating current input is chosen as to drive the first cores exactly into saturation in the absence of a current in said second winding and as to produce in the additional cores a magnetizing force of double saturation value, said auxiliary fluctuating current input being of sawtooth form.

3. Apparatus according to claim 1, in which the windings for the auxiliary fluctuating current input in the two additional cores of each stage are inversely connected to a serial path.

References Cited by the Examiner

UNITED STATES PATENTS

| | | | |
|---|---|---|---|
| 2,973,508 | 2/1961 | Chadurjian | 340—174 |
| 3,139,606 | 6/1964 | Hathaway | 340—146.2 |
| 3,145,366 | 8/1964 | Jensen | 340—146.2 |
| 3,206,724 | 9/1965 | Stahl | 340—146.2 |

MALCOLM A. MORRISON, *Primary Examiner.*

M. J. SPIVAK, *Assistant Examiner.*